United States Patent
Palen et al.

(10) Patent No.: US 9,072,215 B2
(45) Date of Patent: Jul. 7, 2015

(54) METHOD FOR MAKING A TUBE JOINT IN AN AGRICULTURAL IMPLEMENT FRAME

(71) Applicant: AGCO Corporation, Duluth, GA (US)

(72) Inventors: Nelson J. Palen, Beloit, KS (US); Roger L. Meek, Beloit, KS (US); Dennis L. Lewallen, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 445 days.

(21) Appl. No.: 13/651,703

(22) Filed: Oct. 15, 2012

(65) Prior Publication Data

US 2013/0091707 A1 Apr. 18, 2013

Related U.S. Application Data

(60) Provisional application No. 61/547,117, filed on Oct. 14, 2011.

(51) Int. Cl.
*A01B 76/00* (2006.01)
*F16B 7/18* (2006.01)

(52) U.S. Cl.
CPC ............ *A01B 76/00* (2013.01); *Y10T 29/49448* (2015.01); *F16B 7/182* (2013.01)

(58) Field of Classification Search
CPC ...... A01B 76/00; A01B 73/04; A01B 73/044; A01B 73/046; A01B 23/04; F16B 7/182; Y10T 29/49448; Y10T 403/655
See application file for complete search history.

(56) References Cited

U.S. PATENT DOCUMENTS

| 3,830,581 A * | 8/1974 | Furlong | 403/340 |
| 6,732,812 B1 * | 5/2004 | Royer | 172/462 |
| 8,123,429 B2 * | 2/2012 | Comerford et al. | 403/311 |

* cited by examiner

*Primary Examiner* — David Bryant
*Assistant Examiner* — Lee A Holly

(57) ABSTRACT

An agricultural implement frame having at least one beam welded to additional components is formed by cutting the beam into a first tube member and a second tube member having an overlaying portion formed by overlaying ends of the first and second tube members. Each overlaying end has an overlaying wall and a base wall connected by opposing interface side walls. The laser cut forms interface surfaces in the interface side walls. The cut forms a plurality of interlocking load transfer teeth in the interface surfaces. Micro tabs are left uncut in the interface side walls to keep the first and second tube members aligned. The beam is then welded to other components of the implement frame. The micro tabs are broken to separate the first and second tube members so the frame may be folded. When joined, the interface surfaces contact and the interlocking load transfer teeth mesh.

9 Claims, 3 Drawing Sheets

METHOD FOR MAKING A TUBE JOINT IN AN AGRICULTURAL IMPLEMENT FRAME

CROSS REFERENCE TO RELATED APPLICATIONS

This application claims priority to U.S. Provisional Application No. 61/547,117 filed Oct. 14, 2011, entitled "METHOD FOR MAKING A TUBE JOINT IN AN AGRICULTURAL IMPLEMENT FRAME".

BACKGROUND OF THE INVENTION

1. Field of Invention

This invention relates generally to agricultural implement frames and, more specifically to a method for making tube joints in such frames.

2. Description of Related Art

Modern farmers perform ground cultivating operations by pulling a cultivating implement behind a motorized tractor. In one type of cultivating operation, rows or gangs of discs are pulled through soil to break up clods or lumps of soil, as well as old plant material to provide a more amenable soil structure for planting and level the soil surface. Larger and larger cultivating implements are being introduced to reduce the time required to cultivate the farmer's fields. Thus, the width of conventional cultivating implements may vary from, for example, 6 meters (18 feet) to 20 meters (60 feet) or more, and contain multiple rows of soil working devices.

The cultivating implement frames include tubular members welded or connected together by brackets. The frames of large implements often must be reduced in size to accommodate manufacturing processes and shipping size parameters. Hinged joints are often used break down the frames into more manageable sizes. These hinged joints typically require expensive and time consuming welds. It would be desirable to have tubular joints that can be conveniently assembled but meet the necessary structural requirements.

OVERVIEW OF THE INVENTION

In one aspect, the invention is directed an agricultural implement frame having at least one beam with a first tube member and a second tube member joined by a tube joint. The tube joint has an overlaying portion formed by overlaying ends of the first and second tube members, each overlaying end having an overlaying wall and a base wall connected by opposing interface side walls. The interface side walls have interface surfaces extending from a lip at a distal end of the overlaying wall to a foot in the base wall such that when the first and second tube members are joined together, the interface surfaces in the interface side walls of the first and second tube members contact and the lip of the first tube member abuts the foot of the second tube member and the lip of the second tube member abuts the foot of the first tube member. The tube joint also includes at least one clamping fastener configured to clamp together the overlaying ends of the first and second tube members. The tube joint also has a plurality of interlocking load transfer teeth in the interface surfaces configured to transfer load between the first and second tube members of the beam. In one embodiment, the load transfer teeth have a saw tooth pattern and when the beam is under tensile load, the tensile force tends to pull the interface surfaces together.

The invention is also directed to a method for making an agricultural implement frame having at least one beam welded to additional components of the implement frame. The method includes cutting the beam with a laser into a first tube member and a second tube member having an overlaying portion formed by overlaying ends of the first and second tube members. Each overlaying end has an overlaying wall and a base wall connected by opposing interface side walls. The laser cut forms interface surfaces in the interface side walls with each interface surface extending from a lip at a distal end of its overlaying wall to a foot in its base wall. The laser cut forms a plurality of interlocking load transfer teeth in the interface surfaces. Micro tabs are left uncut in the interface side walls to keep the first and second tube members aligned. The beam is then welded to other components of the implement frame. The method also includes breaking the micro tabs to separate the first and second tube members of said beam so the implement frame may be folded, and then joining the first and second tube members in a tube joint such that the interface surfaces in the interface side walls of the first and second tube members contact and the interlocking load transfer teeth mesh. The first and second tube members are then clamped together such that the interlocking load transfer teeth in the interface surfaces transfer load between the first and second tube members of the beam.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the implement.

Figure 1:
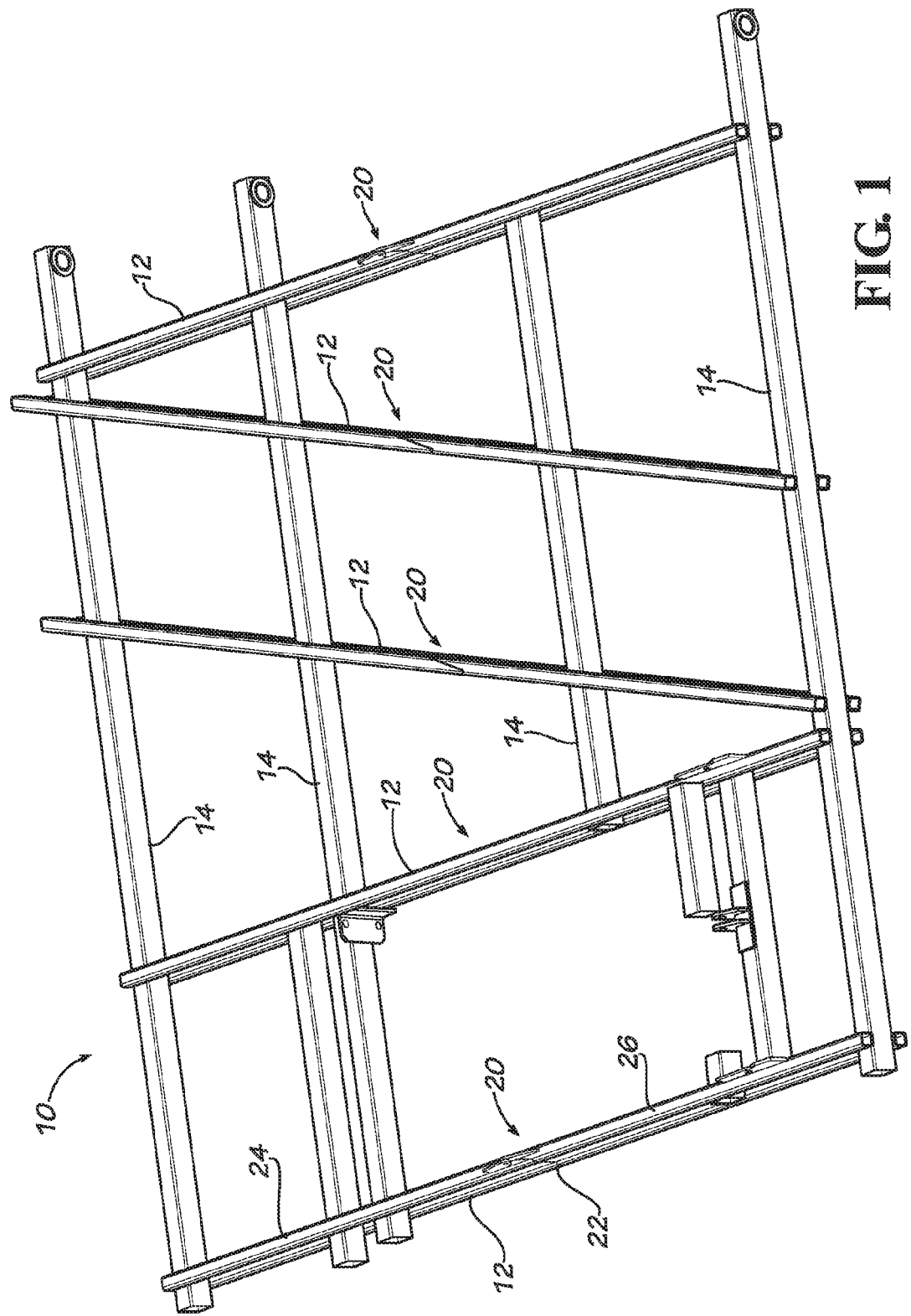
FIG. 1 is a perspective view of a portion of an agricultural implement frame having a beam with tube members joined at a tube joint.

Referring to FIG. 1, therein is shown an implement frame 10 having fore-and-aft extending tubular beam 12 connected to side-to-side extending tubular beam 14. The illustrated beams 12, 14 are rectangular in cross-section with rounded corners, and connected to provide the implement frame 10 with a generally rectangular configuration. For purposes of the description, the fore-and-aft beams 12 are designated as longitudinal beams and the side-to-side beams 14 are designated as transverse beams, but it is to be understood that the positions can be reversed or otherwise changed and that the transverse and longitudinal designations are for providing a reference for clarity in the description of the drawings. Earthworking or seeding tools and hitch structure for towing the implement frame 10 through a field with the tools engaging the soil are not shown for clarity. The heavy loads encountered by the implement frame 10 during transport and fieldworking operations require strong connections at joints of beam 12, 14. While the invention herein is discussed with respect to an agricultural implement frame 10, one skilled in the art will understand that the concepts will also relate to the assembly of other frames without departing from the scope of the invention.

To accommodate the reduced size needed for manufacturing processes and shipping size parameters, longitudinal beams 12 have a tube joint 20 in an intermediate portion 22 of the beam 12. With the tube joints 20 disassembled, the implement frame 10 can be broken down into portions or folded to meet the desired reduced size. The illustrated embodiment shows the tube joints 20 in the longitudinal beams 12, but one skilled in the art will understand that the implement frame 10 may have any number of tube joints 20 in any of the beams 12 and 14.

Figure 2:
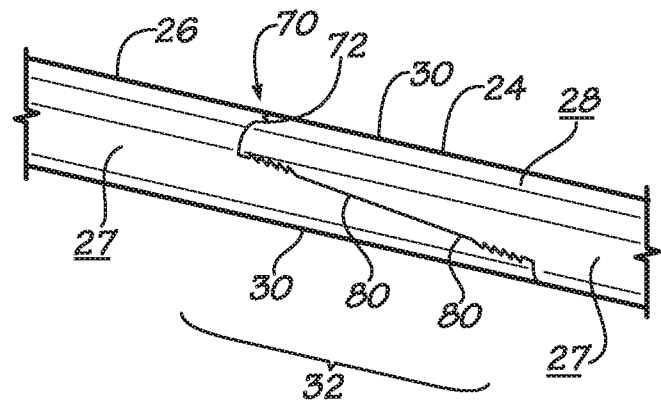
FIG. 2 is an enlarged perspective view of the tube joint in the beam of the frame of FIG. 1.
Figure 3:
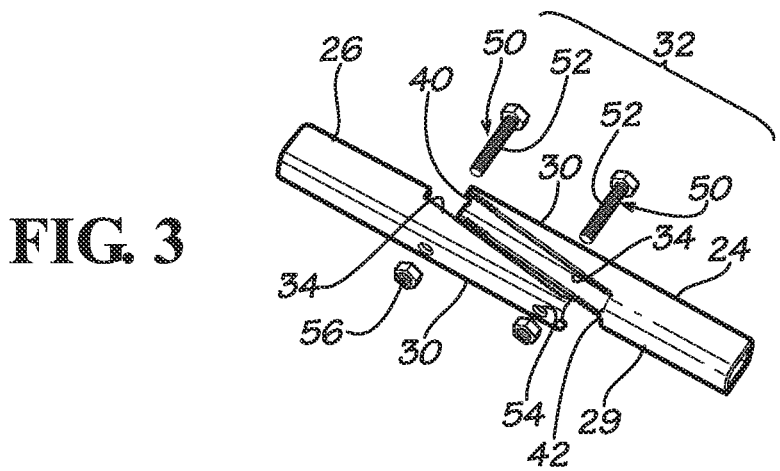
FIG. 3 is a perspective view of clamping fasteners utilized with the tube joint of FIG. 2.

According to the invention, the tube joint 20 provides a strong connection between joining ends of beams 12 without requiring a welded connection. As best seen in FIGS. 2 and 3, the beam 12 has a first tube member 24 and a second tube member 26 joined at the tube joint 20. In the illustrated embodiment, the first and second tube members are of rectangular cross section with the first and second tube members each having opposed side walls 27 connected at corners by an overlaying wall 28 and base wall 29. Overlaying ends 30 of the first and second tube members 24, 26 meet to form the tube joint 20. Desirably, overlaying ends 30 of the first and second tube members 24, 26 are mirror images of each other. Accordingly, discussion made with reference to the overlaying end 30 of the first tube member 24 is also applicable to the overlaying end 30 of the second tube member 26 with the upper and base walls 28, 29 reversed. The overlaying end 30 has an overlaying portion 32 that includes the overlaying wall 28 and interface surfaces 34 in opposing side walls 27 of the tube members 24, 26. The interface surface 34 extends from a lip 40 at distal end of the overlaying wall 28 in the overlaying portion 32 to a foot 42 in the base wall 29 of the tube member 24, 26. Desirably, the interface surface 34 slopes generally diagonally from the lip 40 to the foot 42. When the overlaying portions 32 of the first and second tube members 24, 26 are brought together, the interface surfaces 34 contact and the lip 40 of the first tube member 24 abuts the foot 42 of the second tube member 26 and the lip 40 of the second tube member 26 abuts the foot 42 of the first tube member 24. The first and second tube members 24, 26 may be connected with a hinge (not shown) to aid in folding the tube members.

As seen in FIG. 3, clamping fasteners 50 clamp together the overlaying ends 30 of the first and second tube members 24, 26. Clamping fasteners 50 in the illustrated embodiment include suitable bolts 52 passing through bores 54 in the overlaying portions 32 of the first and second tube members 24, 26. Nuts 56 are received on the threaded bolts 52 to apply a clamping force and press the interface surfaces 34 together. The number and size of the clamping fasteners 50 can be varied to suit the size of the tube joint 20 according to sound engineering judgment. The tube joint 20 thus provide easy and reliable set up of the implement frame 10 components without need for additional welding.

Figure 4:
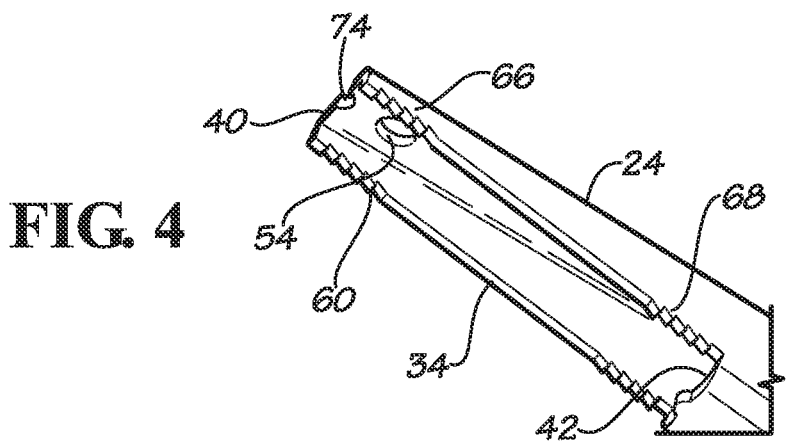
FIG. 4 is a view of a first tube member and the overlaying portion that makes up part of the tube joint.
Figure 5:
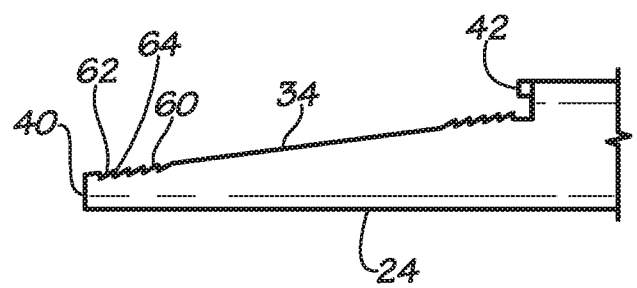
FIG. 5 is another view of the first tube member and the overlaying portion that makes up part of the tube joint of FIG. 4.
Figure 6:
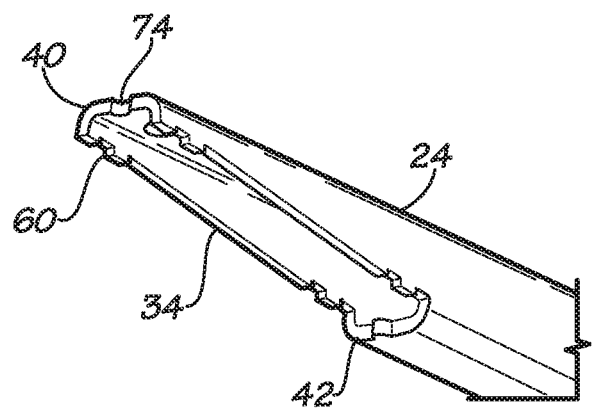
FIG. 6 is a view of another embodiment of a first tube member and the overlaying portion that makes up part of the tube joint.
Figure 7:
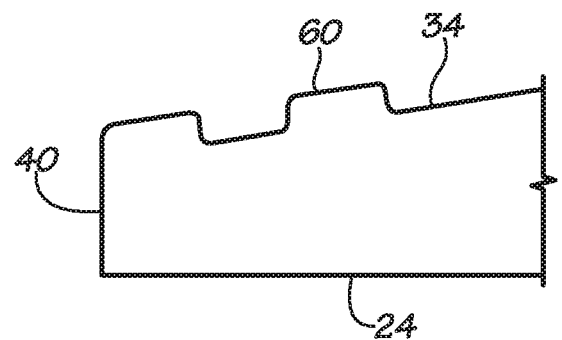
FIG. 7 is another view of the first tube member and the overlaying portion that makes up part of the tube joint of FIG. 6.

According to the invention, the interface surfaces 34 have interlocking load transfer teeth 60 to transfer load between the first and second tube members 24, 26 in the beam 12 as best seen in FIGS. 4 and 5. In the illustrated embodiment, load transfer teeth 60 have a saw tooth pattern with a forward tooth face 62 and a rear tooth face 64. The forward tooth face 62 has a slope that is different that the slope of the rear tooth face 64. Desirably, the slope of the forward tooth face is less than the slope of the rear tooth face 64 as best seen in FIG. 5 such that when the beam 12 is under tensile load, the tensile force tends to pull the interface surfaces 34 together. However, other shapes for load transfer teeth 60, such as rectangular as seen in FIGS. 6 and 7 may also be used without departing from the scope of the invention. Each load transfer tooth 60 is angled to allow easy assembly while maintaining sufficient strength against axial loading. In the illustrated embodiment, there is a first set 66 of load transfer teeth 60 close to the lip 40 and another set 68 of load transfer teeth 60 close to the foot 42. The number and size of the load transfer teeth 60 can be varied to suit design requirements as well as the precision of the cutting machine producing the tube joint 20.

Desirably, the tube joint 20 has an orientation device 70 to aid in latitudinal alignment. In one embodiment, a tab 72 extending from the foot 42 in the base side meshes with a corresponding notch 74 on the lip 40 of the overlaying side. However, one skilled in the art will understand that the locations of the tab 72 and the notch 74 may be reversed and other interacting orientation devices may also be used. The orientation device 70 also may serve to lock the tube joint 20 in the latitudinal direction.

In one embodiment, the tube joint 20 is made using a laser to cut a single tube beam into the first and second tube members. As seen in FIG. 2, small micro tabs 80 may be left uncut to keep the first and second tube members 24, 26 aligned when welding the components of the implement frame 10 during initial assembly. The micro tabs 80 may then be broken when needed to separate the first and second tube members 24, 26 at the tube joint 20 as necessary. For reassembly, the tube members 24, 26 can then be brought together and the clamping fasteners 70 attached to the tube joint 20 to reassemble the implement frame 10.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method for making an agricultural implement frame having at least one beam welded to additional components of the implement frame, the method comprising:

partially cutting said beam with a laser into a first tube member and a second tube member while leaving uncut micro tabs connecting said first tube member and said second tube member, the beam having an overlaying portion comprising overlaying ends of the first and second tube members, each overlaying end having an overlaying wall and a base wall connected by opposing interface side walls, wherein the laser cut forms interface surfaces in the interface side walls, each interface surface extending from a lip at a distal end of its overlaying wall to a foot in its base wall, and wherein the cutting of the beam forms a plurality of interlocking load transfer teeth in said interface surfaces;

maintaining alignment of the first and second tube members with the uncut micro tabs;

welding said beam to components of the implement frame;

breaking the micro tabs to separate the first and second tube members of said beam so the implement frame may be folded;

joining the first and second tube members in a tube joint such that the interface surfaces in the interface side walls of the first and second tube members contact and the interlocking load transfer teeth mesh; and clamping said first and second tube members together such that the interlocking load transfer teeth in the interface surfaces transfer load between the first and second tube members of the beam.

2. The method of claim 1 wherein joining the first and second tube members comprises placing the lip of the first tube member so that it abuts the foot of the second tube member and placing the lip of the second tube member so that it abuts the foot of the first tube member.

3. The method of claim 1 wherein the load transfer teeth are cut in a saw tooth pattern.

4. The method of claim 1 further comprising placing a tensile load on the beam so that the load transfer teeth pulls the interface surfaces together.

5. The method of claim 1 wherein the joining and clamping of the first and second tube members at the tube joint are performed without welding.

6. The method of claim 1 wherein the step of joining the first and second tube members further comprises aligning the first and second tube members in latitudinal alignment using an orientation device.

7. The method of claim 6 wherein aligning the first and second tube members comprises meshing a tab with a corresponding notch, wherein the tab extends from one of the foot in the base wall or the lip of the overlaying wall, and the notch is formed in the other of the foot in the base side or the lip of the overlaying side.

8. The method of claim 1 wherein clamping the first and second tube members comprises passing at least one clamping fastener bolt passing through a bore in the overlaying walls of the first and second tube members and securing a nut on said bolt to apply a clamping force and press the interface surfaces together.

9. The method of claim 1 wherein said beam is cut such that the interface surface slopes diagonally from lip to foot.

* * * * *